(12) United States Patent
Hoshi et al.

(10) Patent No.: US 9,442,042 B2
(45) Date of Patent: Sep. 13, 2016

(54) COMBUSTION DIAGNOSIS DEVICE FOR INTERNAL COMBUSTION ENGINE

(75) Inventors: Makoto Hoshi, Fujisawa (JP); Akira Hanari, Fujisawa (JP); Keiichirou Misumi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 841 days.

(21) Appl. No.: 13/703,428

(22) PCT Filed: Jun. 10, 2011

(86) PCT No.: PCT/JP2011/063328
§ 371 (c)(1),
(2), (4) Date: Dec. 11, 2012

(87) PCT Pub. No.: WO2011/155593
PCT Pub. Date: Dec. 15, 2011

(65) Prior Publication Data
US 2013/0096805 A1 Apr. 18, 2013

(30) Foreign Application Priority Data
Jun. 11, 2010 (JP) .................................. 2010-134521

(51) Int. Cl.
*G01M 15/04* (2006.01)
*F02D 41/00* (2006.01)
(Continued)

(52) U.S. Cl.
CPC ........ *G01M 15/046* (2013.01); *F02D 41/0085* (2013.01); *F02D 41/1498* (2013.01); *F02D 41/22* (2013.01); *G01M 15/11* (2013.01); *F02D 2200/1015* (2013.01); *Y02T 10/40* (2013.01)

(58) Field of Classification Search
CPC .................. F02D 2200/1015; F02D 41/0085; F02D 41/1498; F02D 41/22; G01M 15/046; G01M 15/11; Y02T 10/40

USPC ................ 701/101, 102, 103, 104, 111, 112; 123/294, 406.21, 435, 436, 445, 447, 123/456, 673–675, 332, 344, 406.24; 73/114.02, 114.04, 114.05, 114.25, 73/114.45

See application file for complete search history.

(56) References Cited

U.S. PATENT DOCUMENTS 4,561,397 A * 12/1985 Tsukamoto ......... F02D 41/0087
123/357
5,651,353 A * 7/1997 Allston ............... F02D 41/0085
123/673

(Continued)

FOREIGN PATENT DOCUMENTS

JP    2001-241353    9/2001
JP    2002-38997     2/2002

(Continued)

OTHER PUBLICATIONS

151019 JP 2002-038997 A1 machine translation English.pdf.*
(Continued)

*Primary Examiner* — Erick Solis
*Assistant Examiner* — Carl Staubach
(74) *Attorney, Agent, or Firm* — Staas & Halsey LLP

(57) ABSTRACT

A combustion diagnosis device for a diesel engine having a plurality of cylinders, including an engine speed sensor for detecting a rotational speed of each cylinder, an injection correction amount calculation unit for calculating an amount of correction for fuel injection of each cylinder in accordance with the engine speed sensor, a rotational fluctuation calculation unit for calculating a rotational fluctuation of each cylinder in accordance with the engine speed sensor, and a combustion state determination unit for determining a combustion state of a determination-target cylinder in accordance with the rotational fluctuation when the correction amount calculated by the injection correction amount calculation unit reaches an upper limit threshold value.

12 Claims, 3 Drawing Sheets

(51) Int. Cl.
*F02D 41/14* (2006.01)
*F02D 41/22* (2006.01)
*G01M 15/11* (2006.01)

(56) References Cited

U.S. PATENT DOCUMENTS

| | | | | |
|---|---|---|---|---|
| 6,382,198 | B1* | 5/2002 | Smith | F02D 41/0085 123/673 |
| 7,027,910 | B1* | 4/2006 | Javaherian | F02D 41/0085 123/406.24 |
| 8,103,430 | B2* | 1/2012 | Aliakbarzadeh | F02D 41/0085 123/479 |
| 8,229,647 | B2* | 7/2012 | Ichihara | F02D 41/0085 701/102 |
| 2005/0120786 | A1* | 6/2005 | Tsujimura | G01M 15/11 73/114.12 |
| 2008/0004785 | A1* | 1/2008 | Ikeda | F02D 41/0085 701/101 |
| 2009/0158833 | A1* | 6/2009 | Kusatsugu | F02D 41/0087 73/114.45 |
| 2009/0198434 | A1* | 8/2009 | Tanaka | F02D 41/1495 701/103 |
| 2009/0259382 | A1* | 10/2009 | McKay | F02D 41/0085 701/102 |
| 2011/0106405 | A1* | 5/2011 | Dulzo | F01L 1/18 701/103 |
| 2011/0253100 | A1* | 10/2011 | Kaiser | F02D 41/0085 123/406.24 |

FOREIGN PATENT DOCUMENTS

| | | |
|---|---|---|
| JP | 2004-308464 | 11/2004 |
| JP | 2005-127304 | 5/2005 |
| JP | 2006-63824 | 3/2006 |
| JP | 2011-112017 | 6/2011 |

OTHER PUBLICATIONS

International Search Report of Corresponding PCT Application PCT/JP2011/063328 mailed Aug. 2, 2011.
Patent Abstracts of Japan, Publication No. 2002-038997, Published Feb. 6, 2002.
Patent Abstracts of Japan, Publication No. 2001-241353, Published Sep. 7, 2001.
Patent Abstracts of Japan, Publication No. 2004-308464, Published Nov. 4, 2004.
Patent Abstracts of Japan, Publication No. 2005-127304, Published May 19, 2005.
Patent Abstracts of Japan, Publication No. 2006-063824, Published Mar. 9, 2006.
Patent Abstracts of Japan, Publication No. 2011-112017, Published Jun. 9, 2011.
Written Opinion of the International Searching Authority mailed Aug. 2, 2011 in corresponding International Application No. PCT/JP2011/063328.

\* cited by examiner

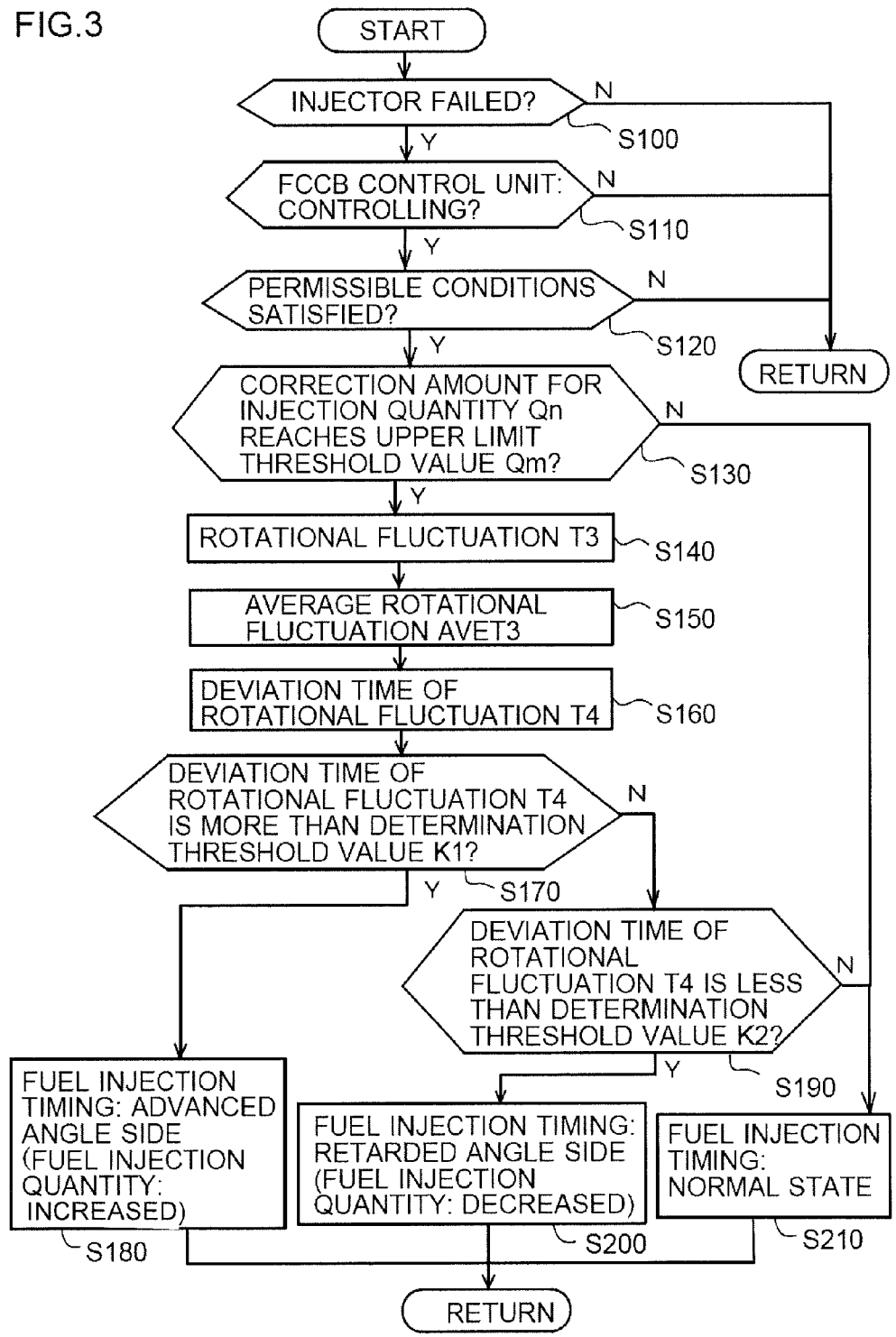

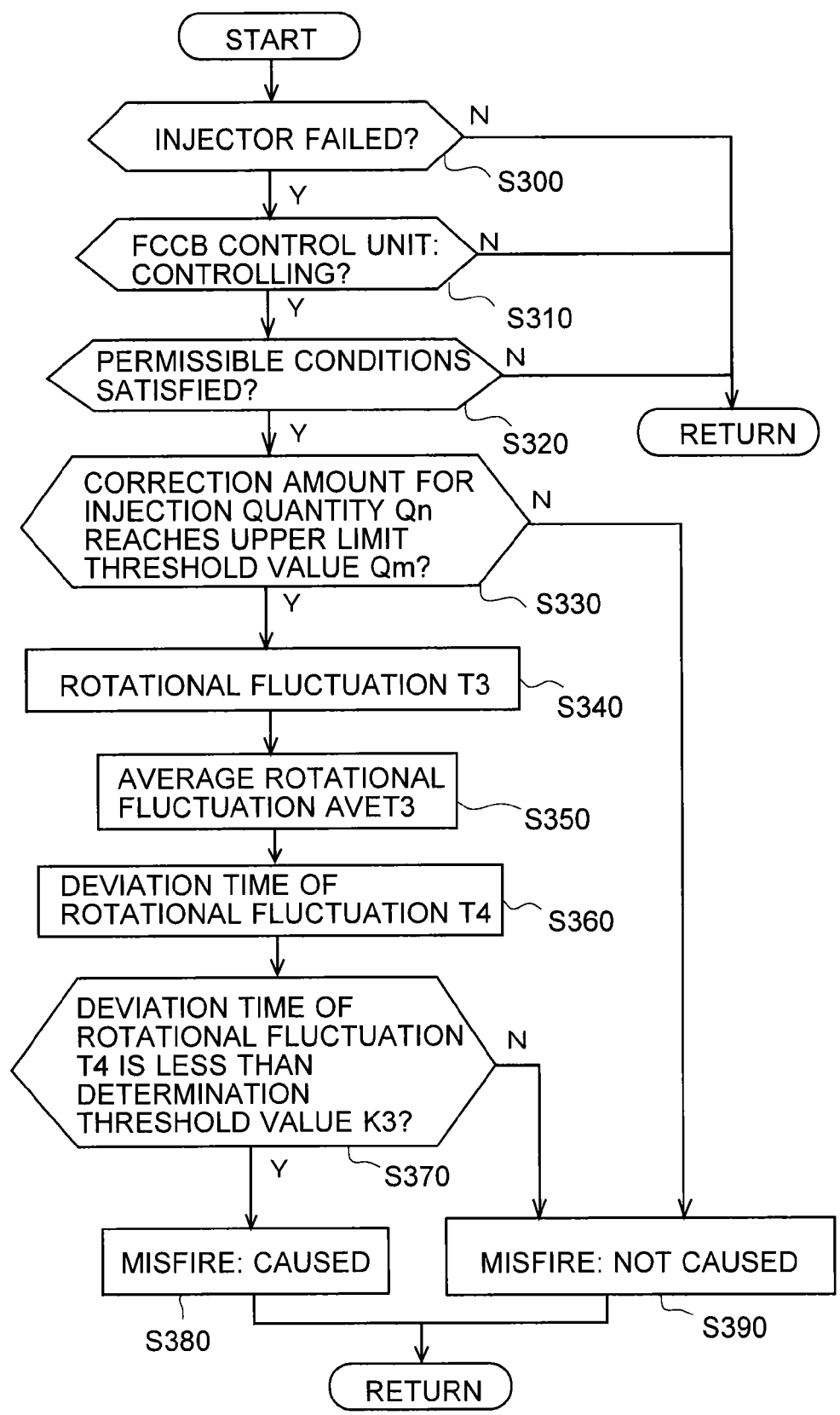

COMBUSTION DIAGNOSIS DEVICE FOR INTERNAL COMBUSTION ENGINE

CROSS-REFERENCE TO RELATED APPLICATIONS

This application claims the benefit of Japanese Patent Application No. 2010-134521, filed on Jun. 11, 2010, the contents of which is incorporated herein by reference, which serves as priority for PCT Application No. PCT/JP2011/063328, filed Jun. 10, 2011.

TECHNICAL FIELD

The present invention relates to a combustion diagnosis device for an internal combustion engine having a plurality of cylinders.

BACKGROUND ART

In a diesel engine, an accumulator fuel injection device in which pumped fuel from a fuel tank is pressurized by a high-pressure supply pump, and in which pressurized fuel is injected from a compression chamber of a common-rail into a combustion chamber via a injector provided in each cylinder, for example, is known as a fuel injection device that is used in an internal combustion engine having a plurality of cylinders.

In the accumulator fuel injection device that includes the injectors provided in each cylinder, the fuel injection quantity that is injected and supplied from the injectors into each combustion chamber may become unstable (fluctuation), and so-called misfire phenomenon that prevents fuels from being ignited may be caused. Therefore, the fluctuation of explosion power in each cylinder or the deterioration of exhaust emission may be caused due to unstable combustion conditions of each cylinder, and as a result, the running performance of the diesel engine may be deteriorated.

For reducing the fluctuation of fuel injection quantities in each cylinder, so-called FCCB control (Fuel Control for Cylinder Balancing) that detects a rotational fluctuation of a crankshaft when the operational state of the diesel engine is in the stable state, and corrects the fuel injection quantity in accordance with the detected rotational fluctuation, is known (for example, refer to a patent document 1).

Further, a combustion diagnosis device for the internal combustion engine that determines the combustion state of the diesel engine in accordance with the correction amount of fuel injection quantity calculated by the FCCB control, is also known.

PRIOR ART DOCUMENTS

Patent Document 1: Japanese Patent Application Publication No. 2006-63824

Incidentally, in the above mentioned combustion diagnosis device using FCCB control, when a diesel engine receiving the effects of disturbances, a correction amount for a fuel injection quantity by the FCCB control has a tendency to be calculated in a large amount. In a case where the combustion state of an internal combustion engine is determined without removing the effects of disturbances, the correction amount for the fuel injection may be calculated in a large amount, and as a result, determination errors may be caused, though the combustion state of the internal combustion engine in fact is a normal state.

The present invention has been designed in consideration of these problems, and an object thereof is to provide a combustion diagnosis device for an internal combustion engine having a plurality of cylinders with which the effects of disturbances are removed to accurately determine the combustion state of each cylinder.

SUMMARY OF THE INVENTION

To achieve the object described above, a combustion diagnosis device for an internal combustion engine having a plurality of cylinders according to the present invention includes an engine rotational speed sensor for detecting the rotational speed of each cylinder of the internal combustion engine, an injection correction amount calculation unit or part for calculating the amount of correction for the fuel injection of each cylinder in accordance with the engine rotational speed sensor, a rotational fluctuation calculation unit or part for calculating the rotational fluctuation of each cylinder in accordance with the engine rotational speed sensor, and a combustion state determination unit or part for determining the combustion state of a determination-target cylinder in accordance with the rotational fluctuation when the correction amount calculated by the injection correction amount calculation unit reaches an upper limit threshold value.

Further, when the rotational fluctuation is larger than a determination threshold value of advanced angle injection timing, the combustion state determination unit may determine the injection timing of the determination-target cylinder as an advanced angle side.

Further, when the rotational fluctuation is smaller than a determination threshold value of retarded angle injection timing, the combustion state determination unit may determine the injection timing of the determination-target cylinder as a retarded angle side, and the determination threshold value of retarded angle injection timing is smaller value than the determination threshold value of advanced angle injection timing.

Further, when the rotational fluctuation is smaller than a determination threshold value of a misfire state, the combustion state determination unit may determine that a misfire is caused in the determination-target cylinder, and when the rotational fluctuation is equal to or more than the determination threshold value of a misfire state, the combustion state determination unit may determine that the misfire is not caused in the determination-target cylinder.

The combustion diagnosis device for the internal combustion engine may further include a fuel injection amount correction unit for correcting a base fuel injection of each cylinder in accordance with the correction amount calculated by the injection correction amount calculation unit.

Further, when the correction amount calculated by the injection correction amount calculation unit is larger than an upper limit correction threshold value, the fuel injection amount correction unit may correct the base fuel injection of each cylinder by previous correction amount. The combustion diagnosis device for an internal combustion engine according to the present invention can accurately determine the combustion state of each cylinder by removing the effects of disturbances.

BRIEF DESCRIPTION OF THE DRAWINGS

FIG. 3 is a flowchart showing a fuel injection timing determination control executed by the combustion diagnosis device for the internal combustion engine according to an embodiment of the present invention.

FIG. 4 is a flowchart showing a misfire state determination control executed by the combustion diagnosis device for the internal combustion engine according to an embodiment of the present invention.

DETAILED DESCRIPTION

Figure 1:
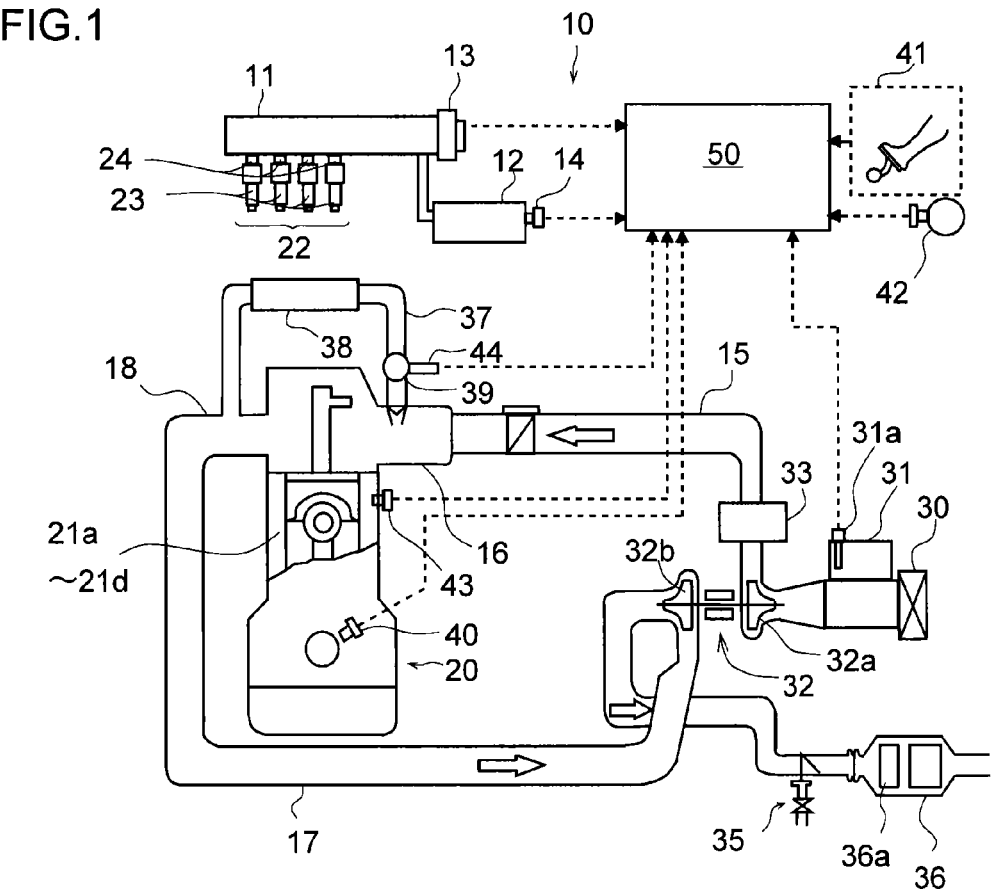
FIG. 1 is a schematic view showing a combustion diagnosis device for an internal combustion engine according to an embodiment of the present invention.

Embodiments of the present invention will be described below with reference to the drawings.

FIGS. 1 to 4 illustrate a combustion diagnosis device 10 for an internal combustion engine according to an embodiment of the present invention. Identical components have been allocated identical reference numerals and have identical names and functions. Accordingly, detailed description of these components will not be repeated.

As shown in FIG. 1, a diesel engine (internal combustion engine) 20 according to this embodiment that includes four cylinders 21a to 21d. In each cylinder 21a to 21d, an injector 22 that injects the fuel directly into a combustion chamber is provided respectively.

The injector 22 is a solenoid-controlled fuel injection valve including a fuel injection nozzle 23 provided with a nozzle hole for injecting the pressurized fuel into the combustion chamber of each cylinder 21a to 21d, a nozzle needle (not shown) slidably received in the fuel injection nozzle 23, and a solenoid valve (not shown) for moving the nozzle needle toward the opening direction. The injector 22 actuates the solenoid valve in accordance with the output control signals (electric pulse) from the electronic constant module ("ECM") 50, to be described below, so that the proper quantity of the pressurized fuel is injected into the combustion chamber of each cylinder 21a to 21d. Further, the injector 22 is connected to a common-rail 11 via a fuel injection pipe 24.

The common-rail 11 accumulates the pressurized fuel that is supplied from a high-pressure supply pump 12, and distributes the accumulated fuel to the injector 22 via the fuel injection pipe 24. Further, fuel pressure (common-rail pressure), which is accumulated in the common-rail 11 corresponds to the injection pressure of the fuel, is detected by a fuel pressure sensor 13 and is outputted to the ECM 50.

The high-pressure supply pump 12 includes a feed pump (not shown) for feeding the fuel from a fuel tank, a solenoid valve (not shown) for adjusting the discharge rate of the pressurized fuel supplied to the common-rail 11, and so on. Further, as shown in FIG. 1, a fuel temperature sensor 14 is provided on the high-pressure supply pump 12. The sensing value of the fuel temperature sensor 14 is outputted to the ECM 50.

As shown in FIG. 1, an intake manifold 16 into which fresh air (intake air) is introduced by opening an intake valve (not shown) via an intake passage 15 is connected to an intake duct of each cylinder 21a to 21d, and an exhaust manifold 18 into which exhaust gas is discharged by opening an exhaust valve (not shown) via an exhaust passage 17 is connected to the exhaust duct of each cylinder 21a to 21d.

As shown in FIG. 1, an air cleaner 30, a mass air flow sensor 31 provided with an intake air temperature sensor 31a, a compressor 32a provided in a turbocharger 32, and an intercooler 33 are interposed on an upstream side of the intake passage 15.

As shown in FIG. 1, a turbine 32b provided in the turbocharger 32, an exhaust throttle valve 35, and a diesel particulate filter ("DPF") 36a provided in an exhaust gas purification device 36 are interposed on an upstream side of the exhaust passage 17.

Further, as shown in FIG. 1, the intake manifold 16 and the exhaust manifold 18 are connected by an exhaust gas recirculation ("EGR") passage 37, and an EGR cooler 38 and an EGR valve 39 are provided in the EGR passage 37.

As shown in FIG. 1, the combustion diagnosis device 10 for the internal combustion engine according to this embodiment includes an engine speed sensor 40, an accelerator opening sensor 41, a vehicle speed sensor 42, a coolant temperature sensor 43, and an EGR position sensor 44. In this embodiment, these sensors are electrically connected to the ECM 50, to be described bellow.

Next, based on FIGS. 1 and 2, the ECM 50 according to this embodiment of the present invention will be described. The ECM 50 performs various controls on the diesel engine 20, and is constituted by conventional components such as a CPU, a ROM, an input port, an output port, and so on. Further, output signals from the engine speed sensor 40, the accelerator opening sensor 41, the vehicle speed sensor 42, the coolant temperature sensor 43, the EGR position sensor 44, and so on are subjected to A/D conversion and then input into the ECM 50.

Figure 2:
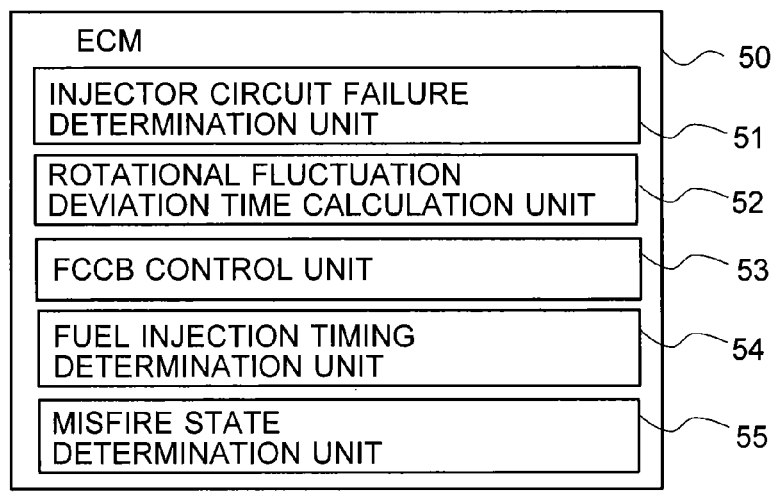
FIG. 2 is a block diagram showing a control unit of the combustion diagnosis device for the internal combustion engine according to an embodiment of the present invention.

Further, as shown in FIG. 2, the ECM 50 includes an injector circuit failure determination unit 51, a rotational fluctuation deviation time calculation unit 52, a FCCB control unit 53, a fuel injection timing determination unit 54, and a misfire state determination unit 55. In this embodiment, these elements are included in the ECM 50 as integrated hardware, but any part thereof can be provided as separate hardware.

The injector circuit failure determination unit 51 determines a failure of the injector 22. More specifically, the injector circuit failure determination unit 51 includes a circuit diagnosis function that determines the failure of the injector 22 in accordance with detect or non-detect of the electrical signals outputted from an electrical circuit (not shown) of the injector 22.

The rotational fluctuation deviation time calculation unit 52 calculates the deviation time of the rotational fluctuation of each cylinder 21a to 21d. More specifically, the rotational fluctuation deviation time calculation unit 52 uses the engine speed sensor 40 for detecting the number of the toothed gears provided on a flywheel (not shown), and measuring the interval time of the count signals. Further, the rotational fluctuation deviation time calculation unit 52 calculates the rotational fluctuation $T_3$ $(=T_2-T_1)$ of each cylinder 21a to 21d by subtracting a rotational speed fluctuation time $T_1$, which is detected during the expansion stroke after the top dead center, from a rotational speed fluctuation time Tz, which is detected around the top dead center. Further, the rotational fluctuation deviation time calculation unit 52 is configured to calculate an average rotational fluctuation $AVET_3$ $(=\Sigma T_k/4)$ of each cylinder 21a to 21d based on the calculated rotational fluctuation $T_3$. Furthermore, the rotational fluctuation deviation time calculation unit 52 calculates the deviation time of the rotational fluctuation $T_4$ $(=T_3-AVET_3)$ of each cylinder 21a to 21d by subtracting the average rotational fluctuation $AVET_3$ from the calculated rotational fluctuation $T_3$.

In this embodiment, the deviation time of the rotational fluctuation $T_4$, which is detected around the top dead center, is calculated by measuring any range of the interval time when the cylinders $21a$ to $21d$ are positioned around the top dead center prior to the fuel injection. Further, the rotational speed fluctuation time $T_1$, which is detected during the expansion stroke after the top dead center, is calculated by measuring any range of the interval time when the rotational speed after explosion is expected to become a peak value.

The FCCB control unit 53 calculates the correction amount for the injection quantity Q. that corrects the fluctuation of the fuel injection in each cylinder $21a$ to $21d$. Further, the FCCB control unit 53 corrects the fuel injection quantity by adding the calculated correction amount for the injection quantity $Q_n$ to a base injection quantity Q. More specifically, in the FCCB control unit 53, a map (not shown) representing the relationship between the deviation time of the rotational fluctuation $T_4$ and the correction amount for the injection quantity $Q_n$, is stored in advance. The FCCB control unit 53 is configured to calculate the correction amount for the injection quantity $Q_n$ by reading a value corresponding to the deviation time of the rotational fluctuation $T_4$ from the map. Further, the FCCB control unit 53 is configured to correct the base fuel injection of each cylinder $21a$ to $21d$ in accordance with the calculated correction amount for the injection quantity $Q_n$. Furthermore, when the correction amount for the injection quantity $Q_n$ reaches an upper limit correction threshold value (to be referred to hereafter as an upper limit threshold value) $Q_m$, the FCCB control unit 52 maintains the correction amount for the injection quantity $Q_n$ at the correction amount for the injection quantity $Q_{n-1}$ that is previously calculated.

The fuel injection timing determination unit 54 determines an advanced angle or a retarded angle of the fuel injection timing that representing the combustion state of each cylinder $21a$ to $21d$. More specifically, in a case when the correction amount for the injection quantity $Q_n$ calculated by the FCCB control unit 53 reaches the upper limit threshold value $Q_m$ and the deviation time of the rotational fluctuation $T_4$ calculated by the rotational fluctuation deviation time calculation unit 52 is more than a determination threshold value of the advanced angle injection timing $K_1$ (to be referred to hereafter as a determination threshold value $K_1$)($T_4$>$K_1$), the fuel injection timing of the determination-target cylinder is determined as an advanced angle side. Further, in a case when the deviation time of the rotational fluctuation $T_4$ is less than a determination threshold value of the retarded angle injection timing $K_2$ (to be referred to hereafter as a determination threshold value $K_2$) ($T_4$<$K_2$), the fuel injection timing of the determination-target cylinder is determined as a retarded angle side. Furthermore, in a case when the deviation time of the rotational fluctuation $T_4$ is equal to or more than the determination threshold value $K_2$ and less than or equal to the determination threshold value $K_1$ ($K_2$<=$T_4$<=$K_1$), the fuel injection timing of the determination-target cylinder is determined as a normal state. In this embodiment, the determination threshold value $K_2$ is smaller than the determination threshold value $K_1$.

In this embodiment, the deviation time of the rotational fluctuation $T_4$, which is used in the determination of the fuel injection timing, may be replaced by integrating and averaging more than one deviation time of the rotational fluctuation $T_4$ being calculated during a plurality of the combustion cycles (for example, 6 cycles), and the fuel injection timing may be determined in accordance with the averaged deviation time of the rotational fluctuation. In this case, the averaged deviation time of the rotational fluctuation, which may be used in the later determinations, can be calculated from the moving average.

The misfire state determination unit 55 determines occurrence or nonoccurrence of the misfire that representing the combustion state of each cylinder $21a$ to $21d$. More specifically, in a case when the correction amount for the injection quantity $Q_n$ calculated by the FCCB control unit 53 reaches the upper limit threshold value $Q_m$ and the deviation time of the rotational fluctuation $T_4$ calculated by the rotational fluctuation deviation time calculation unit 52 is less than a determination threshold value of misfire $K_3$ (to be referred to hereafter as a determination threshold value $K_3$) ($T_4$<$K_3$), the combustion state of the determination-target cylinder is determined that the misfire is caused. Further, in a case when the deviation time of the rotational fluctuation $T_4$ is equal to or more than the determination threshold value $K_3$ ($T_4$=>$K_3$), the combustion state of the determination-target cylinder is determined that the misfire is not caused. In this embodiment, the determination threshold value $K_3$ is smaller than the determination threshold value $K_2$.

In this embodiment, the deviation time of the rotational fluctuation $T_4$, which is used in the determination of the misfire state, may be replaced by integrating and averaging more than one deviation time of the rotational fluctuation $T_4$ being calculated during plurality of the combustion cycles (for example, 6 cycles), and the occurrence or nonoccurrence of the misfire may be determined in accordance with the averaged deviation time of the rotational fluctuation. In this case, the averaged deviation time of the rotational fluctuation, which may be used in the later determinations, can be calculated from the moving average.

In the combustion diagnosis device 10 according to this embodiment of the present invention, having the configuration described above, the following control is performed in accordance with flows shown in FIGS. 3 and 4, for example.

First, a fuel injection timing determination control flow, shown in FIG. 3, will be described. This control flow is started at the same time as the starting of the diesel engine 20 (ON operation of key).

In Step (hereafter, Step will be abbreviated to S) 100, a determination is made by the injector circuit failure determination unit 51 as to whether or not the electrical circuit of the injector 22 is failed due to a disconnection, and so on. When the injector 22 has failed, the control advances to S110, and when the injector 22 has not failed, the control is returned.

In S110, a determination is made as to whether or not the correction control for fuel injection quantity by the FCCB control unit 53 is performed. When the correction control for the fuel injection quantity is performed, the control advances to S120, and when the correction control for the fuel injection quantity is not performed, the control is returned.

In S120, a determination is made as to whether the permissible conditions for the determination of the fuel injection timing are satisfied. The purpose of confirming the permissible conditions for the determination is to prevent the determination errors of the fuel injection timing that may be caused when the operating condition of the diesel engine 20 becomes significantly unstable. Examples of the permissible conditions that can satisfy the determination of the fuel injection timing, for examples, are when the detected value of the accelerator opening sensor 41 is less than or equal to a predetermined threshold value, when the detected value of the coolant temperature sensor 43 is equal to or more than a predetermined threshold value, when a power take-off ("PTO") device (not shown) is not operated, or when a forcible regeneration control of the DPF 36a by the post injection and so on is not performed. When the permissible conditions for the determination of the fuel injection timing are satisfied, the control advances to S130. On the other hand, when the permissible conditions for the determination are not satisfied, the control is returned.

In S130, the fuel injection timing determination unit 54 determines whether or not the correction amount for the injection quantity $Q_n$, which is calculated by the FCCB control unit 53, has reached the upper limit threshold value $Q_m$. When the correction amount for the injection quantity $Q_n$ reaches the upper limit threshold value $Q_m$, the control advances to S140. On the other hand, when the correction amount of the injection quantity $Q_n$ is less than or equal to the upper limit threshold value $Q_m$, the control is returned.

In S140, the rotational fluctuation deviation time calculation unit 52 calculates the rotational fluctuation $T_3$ of each cylinder 21a to 21d by subtracting the rotational speed fluctuation time $T_1$ detected during the expansion stroke after the top dead center from the rotational speed fluctuation time $T_2$ detected around the top dead center.

In S150, the rotational fluctuation deviation time calculation unit 52 calculates the average rotational fluctuation $AVET_3$ of each cylinder 21a to 21d in accordance with the rotational fluctuation $T_3$ that is calculated in S140.

In S160, the rotational fluctuation deviation time calculation unit 52 calculates the deviation time of the rotational fluctuation $T_4$ in each cylinder 21a to 21d by subtracting the average rotational fluctuation $AVET_3$ calculated in S150 from the rotational fluctuation $T_3$ calculated in 5140.

From S170 to S210, the fuel injection timing determination unit 54 determines the fuel injection timing of the determination-target cylinder.

In S170, when the deviation time of the rotational fluctuation $T_4$ is more than the determination threshold value $K_1$ ($T_4>K_1$), the control advances to S180. In S180, the fuel injection timing determination unit 54 determines the fuel injection timing of the determination-target cylinder as the advanced angle side, and then the control is returned. On the other hand, in S170, when the deviation time of the rotational fluctuation $T_4$ is less than or equal to the determination threshold value $K_1$ ($T_4<=K_1$), the control advances to S190.

In S190, a determination is made as to whether the deviation time of the rotational fluctuation $T_4$ is less than the determination threshold value $K_2$. When the deviation time of the rotational fluctuation $T_4$ is less than the determination threshold value $K_2$ ($T_4<K_2$), the control advances to 5200. In S200, the fuel injection timing determination unit 54 determines the fuel injection timing of the determination-target cylinder as the retarded angle side, and then the control is returned. On the other hand, in S190, when the deviation time of the rotational fluctuation $T_4$ is equal to or more than the determination threshold value $K_2$ ($K_2<=T_4<=K_1$), the control advances to S210. In 5210, the fuel injection timing determination unit 54 determines the fuel injection timing of the determination-target cylinder as normal state, and then the control is returned.

Next, a misfire state determination control flow, shown in FIG. 4, will be described. From S300 to S360 of this control flow is the same as S100 to S160 of the above mentioned fuel injection timing determination control flow shown in FIG. 3 and, accordingly, will not be described in detailed.

In S360, the rotational fluctuation deviation time calculation unit 52 calculates the deviation time of the rotational fluctuation $T_4$ in each cylinder 21a to 21d, and then, the misfire state determination unit 55 determines the misfire state of the determination-target cylinder, from S370 to S390.

In S370, when the deviation time of the rotational fluctuation $T_4$ is less than the determination threshold value $K_3$ ($T_4<K_3$), the control advances to S380. In S380, the misfire state determination unit 55 determines that the misfire is caused in the determination-target cylinder, and then the control is returned. On the other hand, in S370, when the deviation time of the rotational fluctuation $T_4$ is equal to or more than the determination threshold value $K_3$ ($T_4=>K_3$) the control advances to S390. In S390, the misfire state determination unit 55 determines that the misfire is not caused in the determination-target cylinder, and then the control is returned.

By employing the configuration described above, actions and effects such as the following can be obtained with the combustion diagnosis device 10 for the internal combustion engine according to the embodiments of the present invention.

The fuel injection timing determination unit 54 determines the fuel injection timing of the determination-target cylinder in accordance with the deviation time of the rotational fluctuation $T_4$ calculated by the rotational fluctuation deviation time calculation unit 52 when the correction amount for the injection quantity $Q_n$ of the FCCB control unit 53 reaches the upper limit threshold value $Q_m$.

Therefore, even when the correction amount for the injection quantity $Q_n$ calculated by the FCCB control unit 53 becomes a large amount due to the effects of disturbances on the diesel engine 20, the determination of the fuel injection timing is executed in accordance with the rotational fluctuation deviation time $T_4$, and as a result, the fuel injection timing of the determination-target cylinder can be accurately determined by removing the effects of the disturbances.

Further, the misfire state determination unit 55 determines the misfire state of the determination-target cylinder in accordance with the deviation time of the rotational fluctuation $T_4$ calculated by the rotational fluctuation deviation time calculation unit 52 when the correction amount for the injection quantity $Q_n$ of the FCCB control unit 53 reaches the upper limit threshold value $Q_m$.

Therefore, even when the correction amount for the injection quantity $Q_n$ calculated by the FCCB control unit 53 becomes a large amount due to the effects of disturbances on the diesel engine 20, the determination of the misfire state is executed in accordance with the rotational fluctuation deviation time $T_4$, and as a result, the misfire state of the determination-target cylinder can be accurately determined by removing the effects of the disturbances.

Note that the present invention is not limited to the embodiments described above and may be amended appropriately within a scope that does not depart from the spirit of the present invention.

For example, the diesel engine 20 is not limited to 4 cylinders, but a single cylinder engine or an engine having more cylinders can be also used. Further, the determination of the combustion state for each cylinder 21a to 21d is not limited to the fuel injection timing or the misfire state of the determination-target cylinder, but for example a fuel injection quantity of the determination-target cylinder can be determined in accordance with a fuel injection period and a lift amount of the core valve in the injector 22 that may be detected by a sensor.

The invention claimed is:

1. A combustion diagnosis device for an internal combustion engine having a plurality of cylinders, comprising:

a sensor to detect a rotational speed of each of the cylinders; and a processor including a rotational fluctuation part configured to calculate a rotational fluctuation of each of the cylinders in accordance with the detected rotational speed;

an injection correction part configured to calculate an amount $Q_n$ of correction for a fuel injection of each of the cylinders in accordance with the calculated rotational fluctuation of each of the cylinders;

a fuel injection amount correction part configured to correct a base fuel injection of each of the cylinders in accordance with the calculated fuel injection correction amount; and a combustion state part configured to determine whether or not a combustion state of a determination-target cylinder is a normal state in accordance with the calculated rotational fluctuation, when the calculated fuel injection correction amount $Q_n$ reaches an upper limit threshold value $Q_m$, and to determine that the combustion state of the determination-target cylinder is a normal state, when the calculated fuel injection correction amount does not reach the upper limit threshold value, wherein, when the calculated fuel injection correction amount $Q_n$ reaches the upper limit threshold value $Q_m$, the injection correction part maintains the fuel infection correction amount $Q_n$ at a fuel injection correction amount $Q_{n\_}$ that is previously calculated.

2. The combustion diagnosis device for the internal combustion engine according to claim 1, wherein, when the calculated rotational fluctuation is larger than a determination threshold value of advanced angle injection timing, the combustion state part determines an injection timing of the determination-target cylinder as an advanced angle side.

3. The combustion diagnosis device for the internal combustion engine according to claim 2, wherein, when the calculated rotational fluctuation is smaller than a determination threshold value of retarded angle injection timing, the combustion state part determines an injection timing of the determination-target cylinder as a retarded angle side, and the determination threshold value of the retarded angle injection timing is smaller than the determination threshold value of the advanced angle injection timing.

4. The combustion diagnosis device for the internal combustion engine according to claim 1, wherein, when the calculated rotational fluctuation is smaller than a determination threshold value of a misfire state, the combustion state part determines that a misfire is caused in the determination-target cylinder, and when the calculated rotational fluctuation is equal to or more than the determination threshold value of the misfire state, the combustion state part determines that the misfire is not caused in the determination-target cylinder.

5. The combustion diagnosis device for the internal combustion engine according to claim 2, wherein, when the calculated rotational fluctuation is smaller than a determination threshold value of a misfire state, the combustion state part determines that a misfire is caused in the determination-target cylinder, and when the calculated rotational fluctuation is equal to or more than the determination threshold value of the misfire state, the combustion state part determines that the misfire is not caused in the determination-target cylinder.

6. The combustion diagnosis device for the internal combustion engine according to claim 3, wherein, when the calculated rotational fluctuation is smaller than a determination threshold value of a misfire state, the combustion state part determines that a misfire is caused in the determination-target cylinder, and when the calculated rotational fluctuation is equal to or more than the determination threshold value of the misfire state, the combustion state part determines that the misfire is not caused in the determination-target cylinder.

7. The combustion diagnosis device for the internal combustion engine according to claim 1, wherein, when the calculated fuel injection correction amount is larger than the upper limit threshold value, the fuel injection amount correction part corrects the base fuel injection of each of the cylinders by a previous correction amount.

8. The combustion diagnosis device for the internal combustion engine according to claim 2, wherein, when the calculated fuel injection correction amount is larger than the upper limit threshold value, the fuel injection amount correction part corrects the base fuel injection of each of the cylinders by a previous correction amount.

9. The combustion diagnosis device for the internal combustion engine according to claim 3, wherein, when the calculated fuel injection correction amount is larger than the upper limit threshold value, the fuel injection amount correction part corrects the base fuel injection of each of the cylinders by a previous correction amount.

10. The combustion diagnosis device for the internal combustion engine according to claim 4, wherein, when the calculated fuel injection correction amount is larger than the upper limit threshold value, the fuel injection amount correction part corrects the base fuel injection of each of the cylinders by a previous correction amount.

11. The combustion diagnosis device for the internal combustion engine according to claim 5, wherein, when the calculated fuel injection correction amount is larger than the upper limit threshold value, the fuel injection amount correction part corrects the base fuel injection of each of the cylinders by a previous correction amount.

12. The combustion diagnosis device for the internal combustion engine according to claim 6, wherein, when the calculated fuel injection correction amount is larger than the upper limit threshold value, the fuel injection amount correction part corrects the base fuel injection of each of the cylinders by a previous correction amount.

* * * * *